United States Patent [19]

Ihlenburg et al.

[11] Patent Number: 4,698,709
[45] Date of Patent: Oct. 6, 1987

[54] CARRIER ARRANGEMENT FOR MAGNETIC HEADS OF MAGNETIC DISK DRIVE ASSEMBLY

[75] Inventors: Rainer Ihlenburg; Guenter Baitz, both of Berlin; Heinz Nixdorf, Paderborn, all of Fed. Rep. of Germany

[73] Assignee: Nixdorf Computer AG, Paderborn, Fed. Rep. of Germany

[21] Appl. No.: 14,187

[22] Filed: Feb. 10, 1987

Related U.S. Application Data

[63] Continuation of Ser. No. 714,954, Mar. 22, 1985, abandoned.

[30] Foreign Application Priority Data

Apr. 2, 1984 [DE] Fed. Rep. of Germany ....... 3412231

[51] Int. Cl.[4] .............................................. G11B 5/48
[52] U.S. Cl. ...................................... 360/104; 360/98; 360/105

[56] References Cited

U.S. PATENT DOCUMENTS

| | | | |
|---|---|---|---|
| 4,011,589 | 3/1977 | Gitzendanner | 360/98 |
| 4,107,748 | 8/1978 | Ho | 360/104 |
| 4,212,043 | 7/1980 | Baker | 360/104 |
| 4,300,176 | 11/1981 | Gilovich | 360/105 |
| 4,346,416 | 8/1982 | Riggle et al. | 360/106 |
| 4,544,972 | 10/1985 | Kogure et al. | 360/105 |

FOREIGN PATENT DOCUMENTS

| | | | |
|---|---|---|---|
| 0056296 | 7/1982 | European Pat. Off. | 360/98 |
| 2611209 | 10/1976 | Fed. Rep. of Germany | 360/98 |
| 57-105863 | 7/1982 | Japan | 360/98 |

Primary Examiner—John H. Wolff
Attorney, Agent, or Firm—Cullen, Sloman, Cantor, Grauer, Scott & Rutherford

[57] ABSTRACT

In a carrier arrangement for the magnetic heads of a magnetic disk drive, the swiveling arms (10) carrying the magnetic heads are fastened onto a bearing sleeve (40) which in turn is pivoted by antifriction bearings (24,26) on a spindle (18) which can be firmly fixed in a bearing block.

2 Claims, 5 Drawing Figures

CARRIER ARRANGEMENT FOR MAGNETIC HEADS OF MAGNETIC DISK DRIVE ASSEMBLY

RELATED APPLICATIONS

This application is a continuation application of U.S. application Ser. No. 714,954, filed Mar. 22, 1985, now abandoned.

TECHNICAL FIELD

The invention relates to a support arrangement for the magnetic heads of a magnetic disk drive, including a plurality of swiveling arms carrying the magnetic heads, which arms are swivelably supported in a bearing block by means of a common spindle and antifriction bearings.

BACKGROUND ART

In the previously known support arrangements of the type described above, the swiveling arms are fastened onto a spindle, which generally consists of steel. The spindle carries pivot pins on both ends on which the antifriction bearings are inserted in bearing bores of a bearing block generally consisting of aluminum.

The bearings are slipped onto the pivot pins of the spindle and the spindle together with the bearings is slipped through the bearing bores and the pack of swiveling arms placed between the U-arms of the bearing block is pushed through until the bearings are seated in the corresponding bearing bores of the U-arm of the bearing block. One of the bearings is constructed as a flanged bearing, the flange of which lies in a correpsonding annular recess of the U-arm belonging to it. The bearing is fixed in the U-arm associated with it by means of a pressure plate. On the other bearing is placed an annular spring which is supported on the outer ring of the antifriction bearing. Then a pressure plate is screwed on, so that the annular spring is under stress. The annular spring forces the axial play out of the antifriction bearings.

A disadvantage of this solution is that the elimination of the bearing play can take place only during the mounting of the support arrangement. A further disadvantage is that by reason of the different thermal expansion of the bearing block consisting of aluminum and of the bearing rings consisting of steel, a play can arise between the bearings and the bearing block during the heating up of the parts due to operation. It has already been attempted to eliminate this play by means of a tension pin and/or tension springs which act on the bearing and clamp this in the bearing bore. On the one hand the play is not effectively eliminated therby, and on the other hand the bearing axis is thereby shifted with respect to the bearing block. This can lead to problems in the adjustment of the magnet heads relative to the plate surface.

SUMMARY OF THE INVENTION

The invention is based on the problem of supplying an arrangement for supporting the magnetic heads of a disk drive which is simple to mount and adjust and ensures a play-free supporting of the pivoting arms independently of any heating up of the parts without thereby harming the precision of the support.

This problem is solved according to the invention by having the pivoting arms fastened onto a bearing sleeve which in turn is pivoted by means of the antifriction bearing on the spindle which is firmly clamped in the bearing block.

By reason of its construction according to the invention, the bearing arrangement can be pre-assembled and preadjusted. The bearing sleeve and the bearings may be made of the same material, so that a heating up of these parts cannot lead to a play between the bearings and the bearing sleeve. The spindle itself is fixed in the bearing block and is thus fixed unshiftably in a predetermined position. Thereby the adjusting of the support arrangement is considerably simpler.

Preferably the inner rings of the antifriction bearings which are seated on the spindle are fixed by at least one spacing sleeve, surrounding the axis coaxially, between a collar of the shaft and a nut which can be screwed onto this. Basically however the possiblity also exists of setting the respective bearings with their inner ring on a shoulder of the shaft and fixing them there. Instead of the nut, other means can be used for fixing the bearings in order to secure the inner rings of the bearings in position in an axial direction.

If necessary the inner ring of the bearings can also be eliminated, in which case the inner bearing races are respectively formed directly on a shoulder of the spindle. In both cases the outer ring of at least one antifriction bearing is firmly joined with the bearing sleeve, while at least one of the outer rings of the antifriction bearing is acted on by axial spring means. This gives rise to an axial displacement of the bearing sleeve, whereby the play is forced out of both bearings. Then if necessary the second bearing can also be joined firmly, for example cemented, with the bearing sleeve.

In order to be able to clamp the spindle in the bearing block without a great deal of adjusting work, according to the invention, in a bearing block made in a U-shape, one open recess each is provided on the free ends of the U-arms for receiving a pivot arm of the spindle, where the recesses can be closed by a shackle and, as seen in the axial direction, show a prismatic cross section diminishing away from the recess opening. By means of the closing shackle the respective pivot pin of the spindle is forced against the prismatic faces, whereby the spindle assumes a definite prescribed position with respect to the bearing block.

Usually the swivel arms can be moved in position by an electromagnetic drive in the form of a plunger type coil arrangement. Here the swiveling arms are connected with a coil which is movable relative to a stationary magnetic core. According to an especially advantageous embodiment of the invention it is proposed that the iron core of the electromagnet forming the magnet core of the plunger type coil arrangement is constructed as a bearing block for the swiveling arms. These measures however can also be used in a conventional support independently of the bearing arrangement described above, as was described at the start as the state of the art.

Further features and advantages of the invention are seen from the following description, which in connection with the annexed drawings will explain the invention on the basis of embodiment examples.

DETAILED DESCRIPTION OF ILLUSTRATIVE EMBODIMENTS

Figure 1:
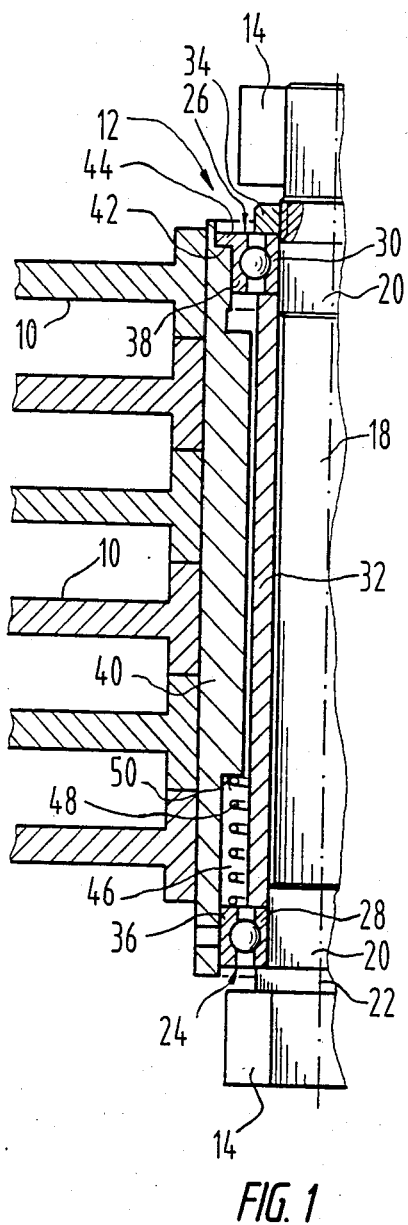
FIGS. 1 to 4 respectively show a half section, containing the axis, through a bearing arrangement according to the invention for the support of swiveling arms for magnetic heads.
Figure 5:
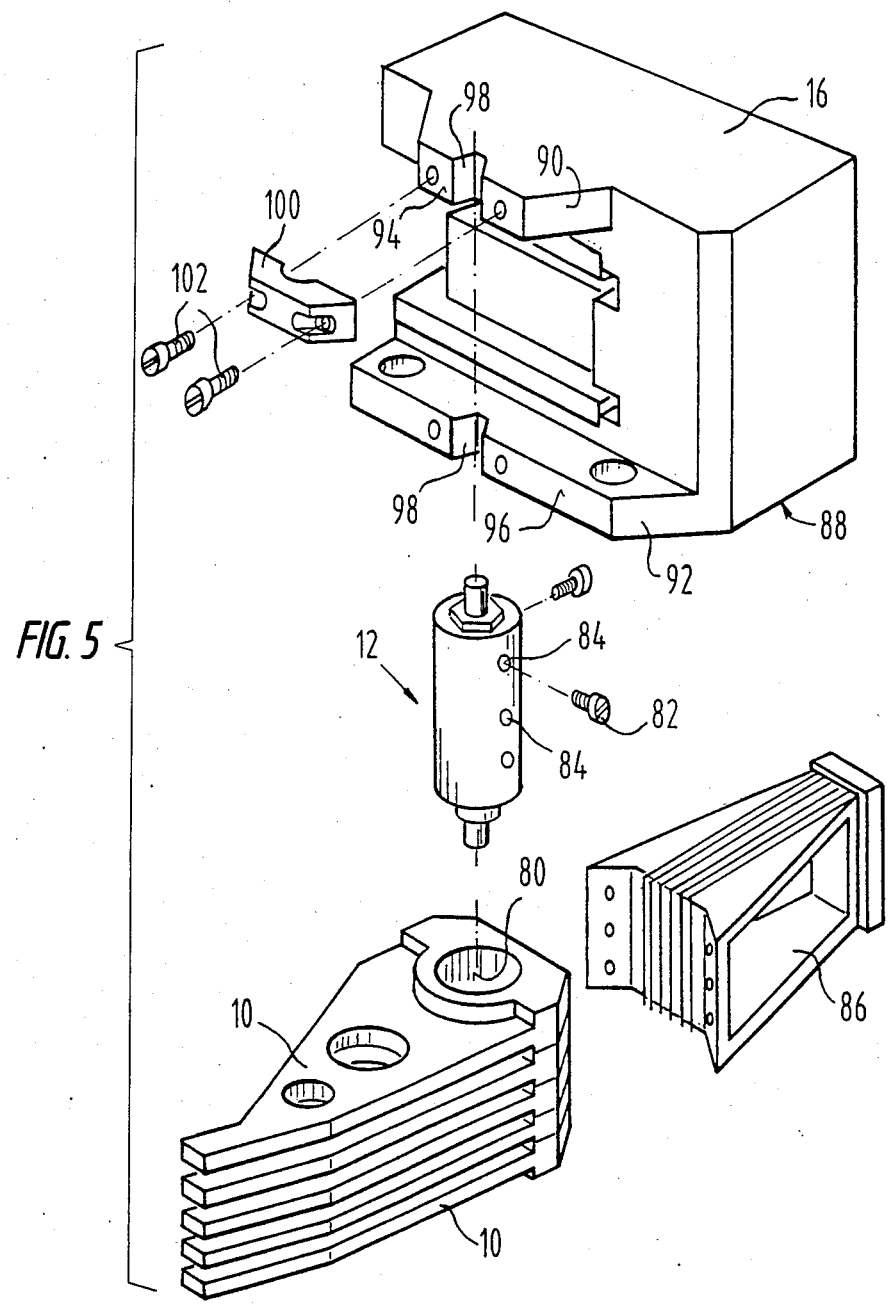
FIG. 5 shows a partially diagrammatic exploded representation, a support arrangement for magnetic heads of a magnetic disk drive.

In FIG. 1 is seen in a half section parts of swiveling arms or supporting arms 10 for magnetic heads, not represented, which are assigned to the magnetic disks of a magnetic disk drive. The supporting arms 10 are stacked one on another in a pack and are firmly joined together. The pack of supporting arms is pivoted by means of a bearing arrangement designated in general as 12 in the U-arms 14 of a U-shaped bearing block 16 (FIG. 5). The bearing arrangement 12 will now be discussed in detail in the following.

The bearing arrangement includes a spindle 18 which near each of its axial ends shows a segment 20 of larger diameter, one of which (the bottom one in FIG. 1) is terminated at its axially outer end by a collar 22. In each of the segments 20 a ball bearing 24, 26 is slipped on. The ball bearing 24 its seated on an inner ring 28 on the collar 22. Inner ring is separated from the inner ring 30 of the ball bearing 26 by a spacing sleeve 32 surrounding the shaft 18. The segment 20 of the spindle 18 which segment carries the ball bearing 26 shows a thread at its axially outer end onto which a nut 34 is screwed on which tightens the inner ring 30 of the ball bearing 26 against the spacing sleeve 32 and also the inner ring 28 of the ball bearing 24 against the collar 22 of the spindle 18. Therewith the inner rings 30 and 28 of both ball bearings 26 and 24 are held immobile on the spindle 18.

The outer rings 36 and 38 of the ball bearings 24 and 26 are inserted in a bearing sleeve 40 which coaxially surrounds the spindle 18 and preferably is fabricated from the same material as the bearings and the spindle. At the upper end in FIG. 1 the bearing sleeve 40 shows a shoulder 42 perpendicular to the axis. It serves for the support of a radial flange 44 of the outer ring 38 of the ball bearing 26. In its bottom segment the bearing sleeve 40 is provided with a hollow bore 46 in which a pressure coil spring 48 is arranged coaxially to the spacing sleeve 32. The coil spring 48 is supported on the one hand on the outer ring 36 of the ball bearing 24 and on the other hand on the end face 50, perpendicular to the axis, of the hollow bore 46. Due to the spring pressure, on the one hand the bearing sleeve 40 and with it the outer ring 38 of the ball bearing 26 is forced upward, while at the same time the outer ring 36 of the ball bearing 24 is forced downward. In this way the bearing play is forced out of the two ball bearings 24 and 26. After the mounting of the bearing and the compensation for the bearing play, the two outer rings 36 and 38 are rigidly joined, cemented for example, to the bearing sleeve 40. No further change in position need be feared, since all of the parts may be fabricated from the same material.

Figure 2:
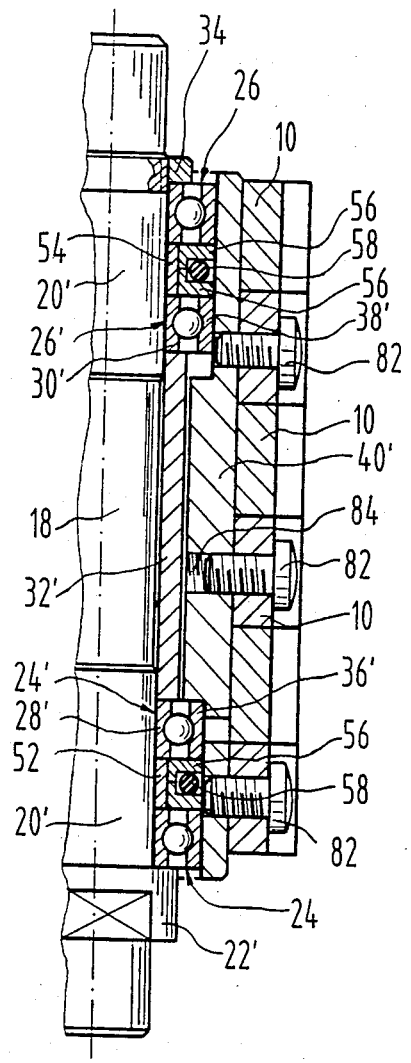

FIG. 2 shows a modified embodiment of the bearing arrangement, where the same parts are provided in turn with the same reference numbers. In the embodiment represented in FIG. 2, the segments 20', with a larger diameter, of the spindle 18 are axially longer than the segments 20 in the embodiment represented in FIG. 1, so that there is room in each segment 20' for two ball bearings 24 and 24', and 26 and 26', respectively. The inner rings 30' and 28' of the bearings 26' and 24' respectively are in turn separated from one another by a spacing sleeve 32'. The bearings 24 and 24', and 26 and 26', respectively, which are adjacent to each other, are respectively separated from each other by spacer rings 52 and 54, respectively, so that the ball bearings 24, 24', 26' and 26 are fixed by means of the spacing sleeve 32' and the spacer rings 52 and 54 between the spindle collar 22' and the nut 34. An annular spring arrangement is arranged between the outer rings of the adjacent ball bearings 26 and 26', and 24 and 24', respectively, which arrangement consists of two annular disks 56 each and one elastic ring 58 each arranged between these. This annular spring arrangement forces the outer rings of adjacent bearings 26 and 26', and 24 and 24', respectively, away from each other, so that the bearing play disappears. The ball bearings 24, 24' 26' and 26 are in turn surrounded by the bearing sleeve 40', which after the mounting of the bearing arrangement can if necessary be cemented with the outer rings of the ball bearing.

Figures 3, 4:
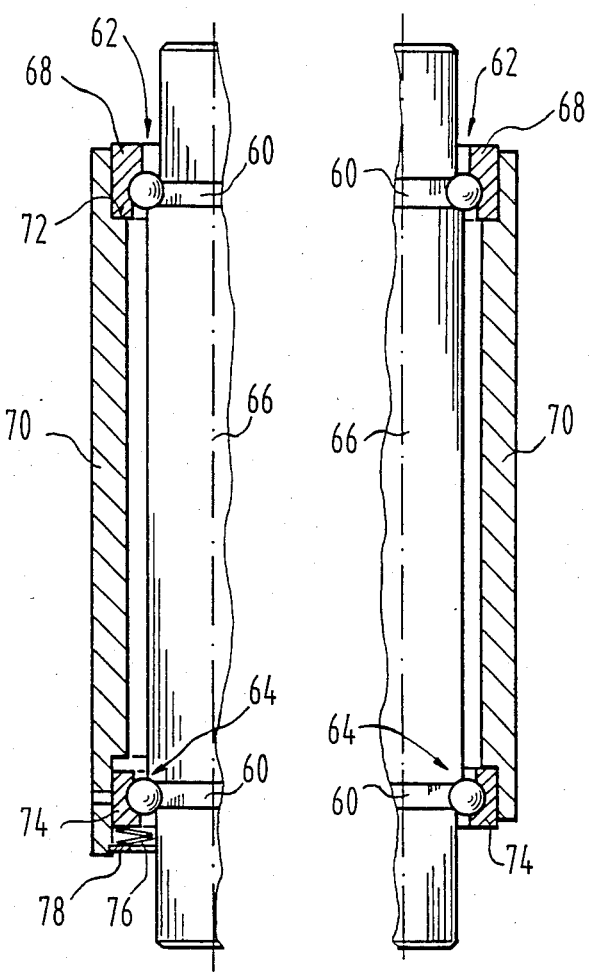

FIGS. 3 and 4 show a further embodiment of the bearing arrangement in which the inner ball bearing races 60 of the ball bearings 62, 64 are respectively formed on a shoulder of the spindle 66. An inner ring is omitted in these cases. In the two embodiment examples represented in FIGS. 3 and 4 the outer ring 68 of the ball bearing 62 is forced into the bearing sleeve 70 until it is seated on a shoulder 72. The outer ring 74 of the other ball bearing 64 is either spring-loaded with star springs 76 (FIG. 3) or, like the outer ring 68, is forced into the bearing sleeve 70 (FIG. 4) with exact fitting in such a way that the bearing sleeve 70 is free of play with respect to the spindle 66. In the embodiment according to FIG. 3, the start spring 76, which is supported on a spring ring 78 inserted in the bearing sleeve 70, forces the play out of the two ball bearings 62 and 64. After the mounting of the bearing arrangement, the outer ring 74 is preferably cemented to the bearing sleeve 70.

A bearing arrangement 12 constructed and preassembled according to FIGS. 1 to 4 is inserted in the bearing bores 80, which are aligned with each other, of the swivel arms 10 which are stacked one over another to form a stack and joined to the stack of swiveling arms by screws 82 in the manner seen in FIG. 2, where the screws 82 engage in radially aligned threaded bores (84) in the bearing sleeve 40' (40,70). A plunger type coil 86 is also screwed onto the pack of swiveling arms, which coil in combination with the electromagnet 88 represented in FIG. 5 serves as a positioning drive for the swiveling arms 10. The iron core of the electromagnet 88 forming the magnet core, in the embodiment example represented in FIG. 5, forms at the same time the bearing block 16 which is approximately U-shaped, and the U-arms 90 and 92 of which on their free end edges 94,96 each show a prismatic recess 98 which is open to the outside. In these recesses are inserted the axial ends of the spindle 18 of the unit consisting of the bearing arrangement 12, the swiveling arms 10 and the plunger type coil 86 and are fixed with the aid of the closing shackles 100 which are screwed tightly with screws 102 onto the respective end faces 94 and 96. The prismatic shape of the recesses 98 ensures a firm seating free of play of the shaft 18 in a well-defined prescribed position with respect to the bearing block 16.

The foregoing description shows that with the carrier arrangement according to the invention a free-of-play, precise and simply mounted support of the swiveling or supporting arms for the magnetic heads can be achieved in which the play does not change even with heating up.

We claim:

1. Apparatus for supporting a stack of magnetic head support arms (10) for rotation about a common axis, comprising:
- a spindle shaft (66) having first and second axially spaced, circumferentially extending inner bearing races (60) defined in the outer circumferential surface thereof;
- a bearing sleeve (70) surrounding said spindle shaft (66) and upon which said magnetic head support arms (10) are mounted;
- first and second axially spaced outer races (68, 74) mounted within said bearing sleeve (70) and respectively including first and second circumferentially extending outer bearing race surfaces;
- a first bearing (62) captured between said first inner race (60) and said first outer race (68); and
- a second bearing (64) captured between said second inner race (60) and said second outer race (74),
- said outer races (68,74) and said bearings (62,64) rotatably mounting said bearing sleeve (70) directly onto said spindle shaft (66) with said bearings (62, 64) bearing directly on said spindle shaft (66) via said inner races (60) with said spindle shaft (70) guiding the rotation of said bearing sleeve (66) and said mounted magnetic head support arms (10) about said common axis.

2. The apparatus of Claim 1, wherein said bearing sleeve (70) includes a pair of axially spaced shoulders (72) for maintaining axial separation of said first and second outer races (68, 74) and said first and said outer races (68, 74) are respectively seated against said shoulders (72).

* * * * *